Aug. 16, 1966  A. M. MAROTH  3,266,333
MECHANICAL TRANSMISSION
Filed June 1, 1964  5 Sheets—Sheet 1
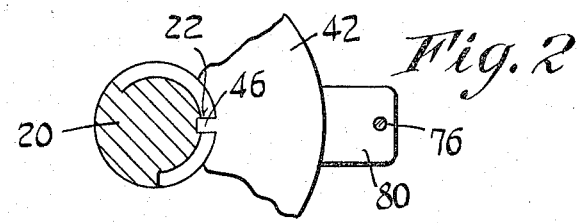
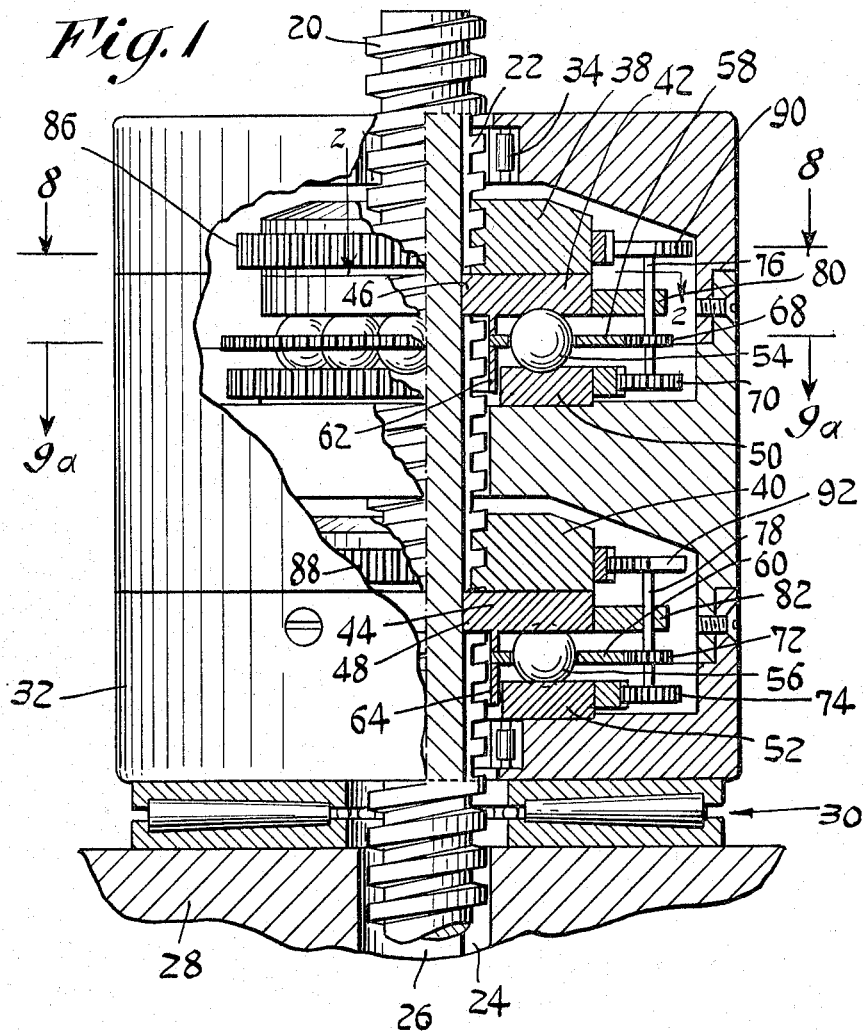
INVENTOR.
Arthur M. Maroth
BY
H. Gibner Lehmann
AGENT Aug. 16, 1966  A. M. MAROTH  3,266,333
MECHANICAL TRANSMISSION Filed June 1, 1964  5 Sheets-Sheet 2

INVENTOR.
Arthur M. Maroth
BY
H. Gibner Lehmann
AGENT

Aug. 16, 1966

A. M. MAROTH 3,266,333

MECHANICAL TRANSMISSION

Filed June 1, 1964

INVENTOR.
Arthur M. Maroth
BY
H. Gilmer Lehmann
AGENT

Aug. 16, 1966  A. M. MAROTH  3,266,333
MECHANICAL TRANSMISSION
Filed June 1, 1964  5 Sheets-Sheet 4

INVENTOR.
Arthur M. Maroth
BY
*H. Gilmer Lehmann*
AGENT

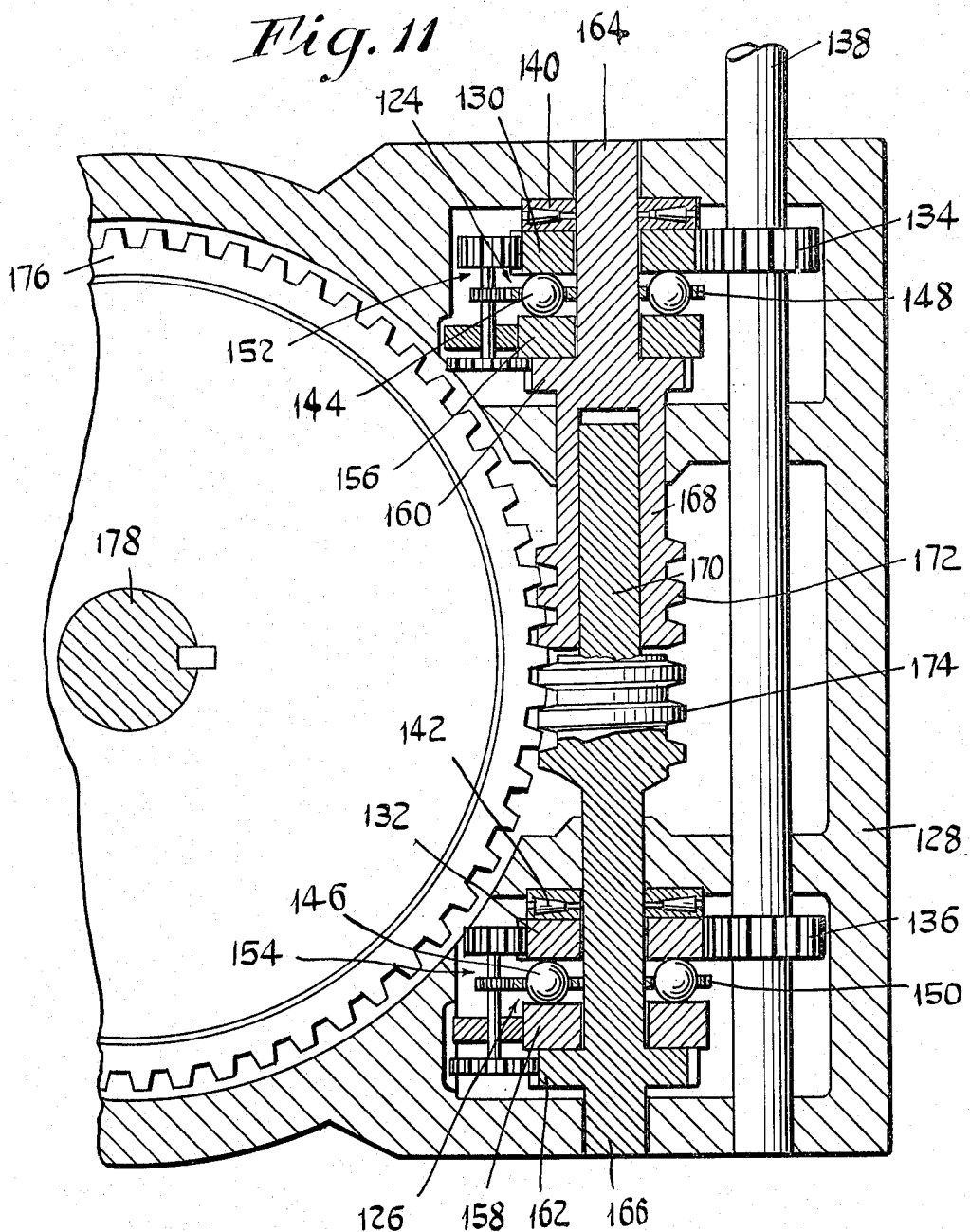

United States Patent Office 3,266,333
Patented August 16, 1966

3,266,333
MECHANICAL TRANSMISSION
Arthur M. Maroth, % Maroth Engineering Company,
Grumman Hill Road, Wilton, Conn.
Filed June 1, 1964, Ser. No. 371,415
13 Claims. (Cl. 74—424.8)

This invention relates to mechanical transmissions, and more particularly to very low friction transmissions of the type which employ a cam action and effect a speed reduction in transmitting power between the input and output members.

The present invention concerns improvements in the mechanical transmission described and claimed in my patents, Nos. 2,836,985 dated June 3, 1958 and 2,928,289 dated March 15, 1960, both entitled "Torque Converting Apparatus."

An object of the invention is to provide an improved mechanical transmission of the very low friction type set forth in my above identified patents, which enables a greater mechanical advantage or ratio to be obtained with a given size and type of transmission structure.

Another object of the invention is to provide an improved mechanical transmission as above characterized, wherein an advantageous overlap of the functions of the load-carrying components is had, thereby to effect a more reliable shifting of loads than was heretofore possible and to enable the transmission components to be fabricated with a lesser degree of precision, the latter advantage being had without adversely effecting the operation.

Yet another object of the invention is to provide an improved mechanical transmission in accordance with the foregoing, wherein the rolling anti-friction members are advantageously arranged in groups each of which assumes load stresses a part of the time.

The foregoing objects are accomplished, in accordance with the invention, by the provision of non-uniform successive cam elements or slopes in rotary load-carrying cam members, this organization enabling an increased effective length of the ascending or load-bearing contours to be obtained as well as a decreased length of the descending or non-load carrying contours. Such non-uniform successive cam surface organization enables a desirable overlap to be had of the load-carrying intervals of multiple cam assemblages operating in alternate phases. With the distribution of the rolling members in groups it is now possible, in accordance with the invention, for one or more of the rolling members in one cycle of operation to follow circumferential paths of different radii whereby they act on different, radially inward or radially outwards portions of the rotary cams. This organization enables a desirable increase to be effected in the load transfer time.

Yet another object of the invention is to provide an improved mechanical transmission as above set forth, wherein a more uniform output movement is had, as well as an increase in the transfer time. This is accomplished, in accordance with the invention, by arranging the rolling members on the rotary cams so that they are non-symmetrically or non-uniformly disposed around the 360° working area of the cam.

Still another object of the invention is to provide an improved mechanical transmission of the kind set forth, wherein a greater load capacity is had as well as a smoother output movement while at the same time the radial or diametric dimensions of the transmission may be made smaller. In accomplishing this, the invention provides a number of duplicated cam assemblages which are arranged coaxially, a total of four such assemblages being shown in one embodiment. Where more than two such cam assemblages are placed in coaxial relationship, the output movement will be much more constant, and will be acceptable even where critical mechanical requirements are indicated.

Features of the present invention reside in the provision of an improved mechanical transmission as above set forth, wherein the improved results are obtained by relatively simple and minor modifications of the transmission structures illustrated and described in my identified patents.

Other features and advantages will hereinafter appear.

FIGURE 1 is a view partly in vertical section and partly in elevation, showing one form of mechanical transmission as provided by the invention, wherein a turning movement is converted to a linear movement with a great mechanical advantage, providing much greater force at lesser speed.

FIG. 2 is a fragmentary horizontal section, taken on the line 2—2 of FIG. 1.

FIG. 11 is an axial sectional view through a transmission representing another embodiment of the invention, wherein rotary motion is converted to rotary motion, with a great mechanical advantage.

Figure 3:
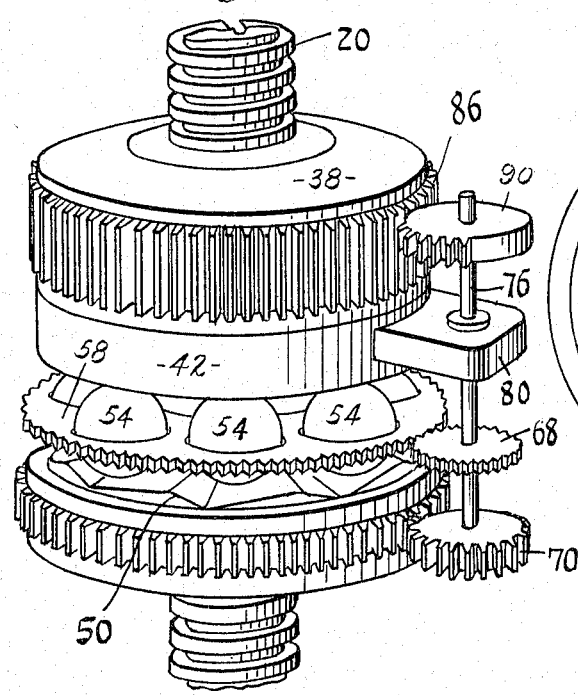
FIG. 3 is a perspective view of one rotary cam unit (of which there are two in FIG. 1), as provided by the invention.
Figure 4:
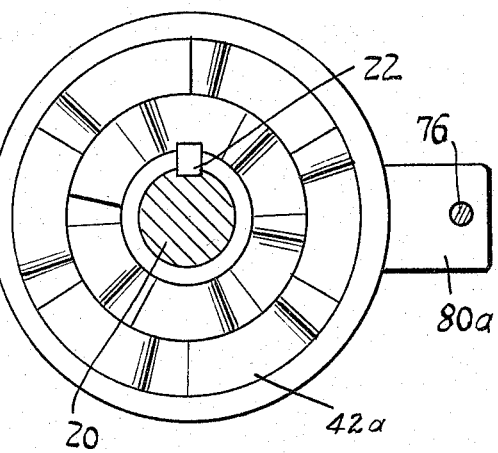
FIG. 4 is a bottom plan view of a modified upper rotary cam element usable as an alternative in the transmission unit of FIG. 3 and showing inner and outer cam tracks instead of a single track.

As already set forth above, the present invention involves improvements in the mechanical transmissions described in detail and claimed in my Patents Nos. 2,836,985 and 2,928,289. The basic concepts illustrated and described in these two patents are also present in the mechanical transmission devices as provided in the present invention, and accordingly an understanding of the present improvements may also be readily had by referring to the drawings and specifications of my identified issued patents.

Referring first to FIGS. 1–9, the mechanical transmission as illustrated therein comprises a toothed driven member 20 in the form of a long screw, said member representing the output of the transmission and having essentially linear or axial movement without any turning whatsoever. To prevent its turning, the screw 20 has a keyway 22 which accommodates a fixed key 24 provided in a vertical bore 26 of a stationary supporting base structure 28. As seen in FIG. 1, the output screw 20 is supported in a vertical position by bearing means comprising a large anti-friction thrust bearing assemblage 30 supported on the base member 28 and in turn supporting a rotary cylindrical housing 32 which also constitutes the rotary input member of the transmission, the housing 32 having a central bore through which the screw 20 extends and said housing at its upper end being provided within the central bore with a radial anti-friction bearing assemblage 34 engaging an upper portion of the output screw 20. The inner race of the upper bearing assemblage 34 slidably receives the output screw 20, whereby the latter may experience axial movement without requiring displacement of the bearing assemblage.

With the above organization, the output screw or toothed driven member 20 may have vertical axial movement while at the same time being prevented from having any turning movement by virtue of the stationary key 24 of the base 28 occupying the keyway 22 of the screw.

Engaged with the teeth of the screw 20 are two threaded rotary driving members 38 and 40 which are in the form of threaded nuts, the said driving members being both turnable and axially movable, and alternately effecting the upward advance movement of the output screw 20 in response to their own alternate upward axial movements. Since the rotary driving members or nuts 38, 40 may also have turning movements, this latter is utilized to enable the driving members or nuts to experience a downward, reverse or return axial movement (by virtue of their own turning) without requiring retrograde movement of the driven screw 20.

The alternate upward (axial) driving movements of the nuts 38, 40 are effected respectively by rotary cams 42, 44 which encircle the screw 20 and are mounted thereon for solely axial movement. Turning movement of the rotary cams 42, 44 is prevented by keys 46, 48 (see FIG. 2) which are accommodated in the keyway 22 of the non-turning output screw 20.

Cooperable with the rotary (but non-turning) upper cams 42, 44 are lower rotary cams 50, 52 respectively which also encircle the output screw 20 and are turnably mounted but prevented from having any axial movement. Between the pairs of cams 42, 50 and 44, 52 are anti-friction roller elements 54, 56 shown as being in the form of balls, said balls engaging lower cam surfaces on the upper cams 42, 44 and upper cam surfaces on the lower cams 50, 52.

The roller elements or balls 54, 56 are respectively carried in rotary cages 58, 60 which are turnably carried on depending sleeves 62, 64 of the upper cams 42, 44. The roller cages 58, 60 and the lower rotary cams 50, 52 are power driven, the cages being driven at half the speeds of the cams, and this is effected as follows: The lower cams 50, 52 are rigidly affixed to the driven housing 32 which constitutes the driven or input member of the transmission, whereby the cams turn at the same rate of speed as the housing 32 at all times. Further, the lower cams are prevented from having axial movement by virtue of their rigid connection to the housing 32 which rests on the large bearing assemblage 30 carried by the stationary base 28. The half speed drive of the ball cages 58, 60 is effected by providing gear teeth on the outer peripheries of the lower rotary cams 50, 52. Engaged with the said gear teeth are pinions 68 and 70 for the upper drive unit of FIG. 1, and pinions 72, 74 for the lower drive unit of FIG. 1. The pairs of pinions 68, 70 and 72, 74 are carried respectively by jack shafts 76 and 78, said shafts having bearings in lugs 80, 82 of the non-turning upper cams 42, 44. By such arrangement, the ball cages 58, 60 can be made to turn at half the speed of the lower rotary cams 50, 52, thereby to cause the anti-friction balls 54, 56 to roll on the associated cam surfaces in their intended manner without slippage.

The pairs of cams 42, 50 and 44, 52 have stepped cam surfaces which are so arranged that a continuous turning movement of the lower cams while the upper cams remain in a non-turning condition will effect an alternate separating and approaching movement of the upper and lower cams of each pair. The separation of the cams represents the working stroke by which the upper cams effect the lifting of the screw 20, whereas the approaching movement of the cams represents the return, non-working stroke by which the lifting nuts 38, 40 are enabled through a turning movement of their own to return to a fresh starting position while not under load, as will be hereinafter explained more fully in detail.

It has been mentioned above that the lifting nuts 38, 40 alternately apply lifting axial movement to the output screw 20, and are alternately returned downward after completion of each phase of working stroke, this latter being accomplished by turning of the nuts whereas the power stroke or lifting movements of the nuts is effected by purely axial movement without any turning whatsoever. This is accomplished by arranging the upper lifting cam assemblage of the transmission to operate 180° out of phase with respect to the lower lifting cam assemblage whereby the lifting period of the upper assemblage will enable the lifting nut of the lower assemblage to be returned (by its turning movement) to a fresh lower starting position while it is not under load, and vice versa. Thus 180° out-of-phase relationship of the upper and lower cam assemblages is effected by the relative positionings of the pairs of cam and roller assemblages. That is, the stepped portions of the cam surfaces of the upper cam unit which effect a separation of the upper and lower cams of the unit to provide the lifting movement of the nut 38, will occur during a period when the complementary stepped surfaces of the lower pair of cams permit these to approach each other. For such approaching movement, the lower driving nut 40 may be quickly returned downward to a fresh starting position by effecting an appropriate momentary turning movement of the nut, and during a reversal of these conditions of the two lifting assemblages, a similar returning movement of the upper driving nut 38 may be effected as the cams of the upper pair 42, 50 are allowed to approach each other.

The momentary turning (and returning) movements of the driving nuts 38, 40 are effected by providing gear teeth 86, 88 respectively on the upper and lower nuts 38, 40, such teeth being engaged by segmental gears 90, 92 carried respectively on the jack shafts 76, 78. By such arrangement, the periodic engagement of the segmental pinions or gears 90, 92 with the teeth 86, 88 of the lifting nuts will periodically effect a quick, limited turning movement of the nuts which are so arranged that they follow the receding or downwardly shifting upper rotary cams 42, 44 at the proper time, to effect the retraction of the nuts and to enable these to assume fresh driving positions.

It will now be understood from the foregoing that a continuous turning movement imparted to the input driving member or housing 32 will effect continuous turning of the lower cam members 50, 52, continuous turning at one-half speed of the ball cages 58, 60 and alternate lifting and lowering of the upper rotary cams 42, 44 together with the associated driving nuts 38, 40. During the intervals when the upper cams 42, 44 are allowed to have a lowering or descending movement, engagement will occur between the gear segments 90, 92 and the proper associated driving nuts 38, 40 to effect a rotary retraction of each driving nut to a fresh starting position. The alternate axial raising movements of the nuts 38, 40 will effect a continuous upward movement of the output screw 20.

The operation and functioning of the transmission as above described is similar to that of the transmission in my identified issued patents.

In accordance with the present invention, an improved more uniform driving action of the output screw 20 is had while requiring less precise dimensions and less critical cooperation of the upper and lower driving cam assemblages, and in addition the transferral of the load from the upper cam assemblage to the lower and vice versa does not have to be effected in an infinitely small time, which in some circumstances may comprise a small fraction of a second. In accomplishing this, a unique shaping of the cam contours of the inner and outer cam tracks is provided, which also has the additional advantage of providing a higher mechanical ratio between the input and output movements.

Figure 5:
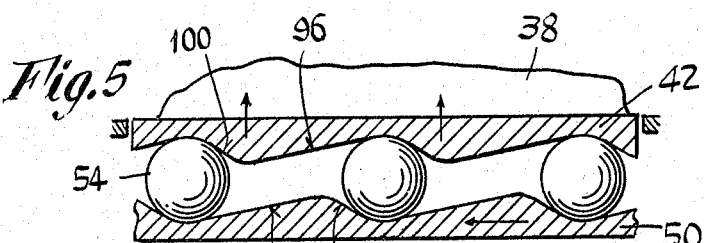
FIG. 5 is a schematic representation illustrating the action of two roatry cam units or members, either single track or double track, of the transmission unit of FIG. 3, the two cam members being shown in their most closely spaced positions.
Figure 6:
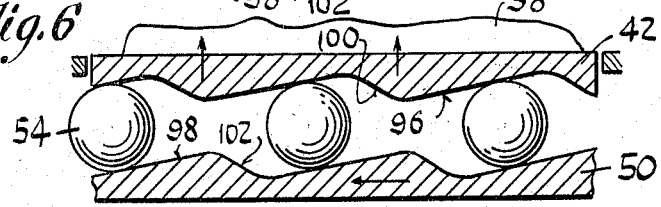
FIG. 6 is a view like that of FIG. 5, but showing the two rotary cam members after a certain amount of separating movement has taken place.
Figure 7:
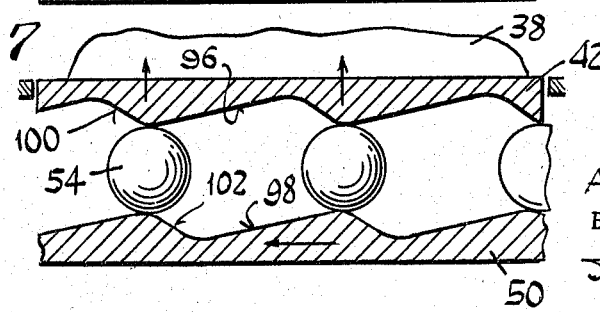
FIG. 7 is a view like that of FIGS. 5 and 6, showing the rotary cam members in the positions where they are most widely spaced.
Figure 8:
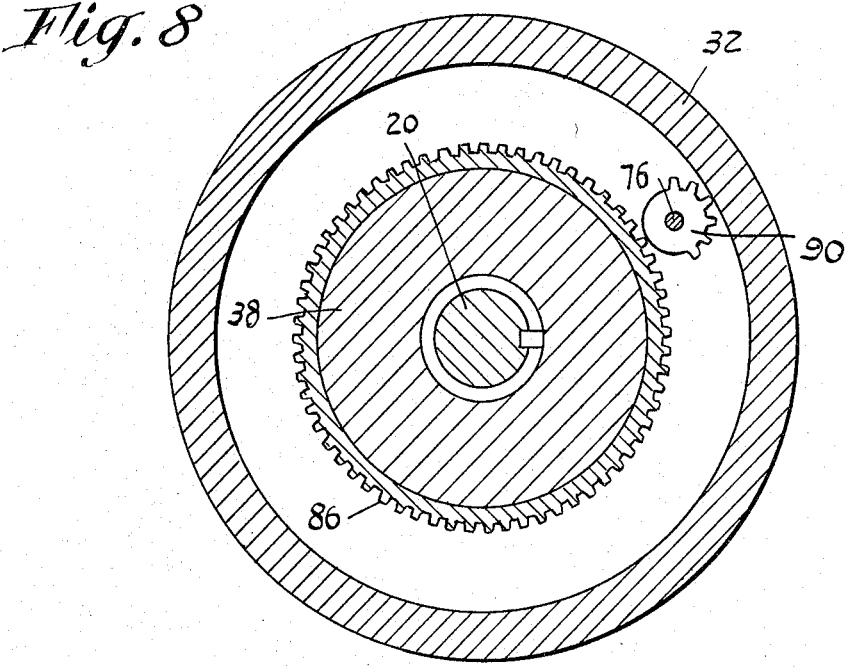
FIG. 8 is a horizontal sectional view, taken on the line 8—8 of FIG. 1.

Referring to FIGS. 5, 6 and 7, the upper and lower rotary cam members 42, 50 have ascending or working slopes 96, 98 of increased length, as compared with the cams of my patents referred to. Also, the descending or receding slopes 100, 102 of the cams have reduced length, compared with the cams of my patents above identified. Such arrangement of non-uniform successive slopes on each cam member provides a desirable higher mechanical advantage due to the long ascending portions. Also, a more reliable return of the driving nuts to new starting positions is possible since the load carrying intervals of each cam unit are of greater duration and since the return of the nuts may be very quickly effected because of the absence of load on them at such times.

Figure 9:
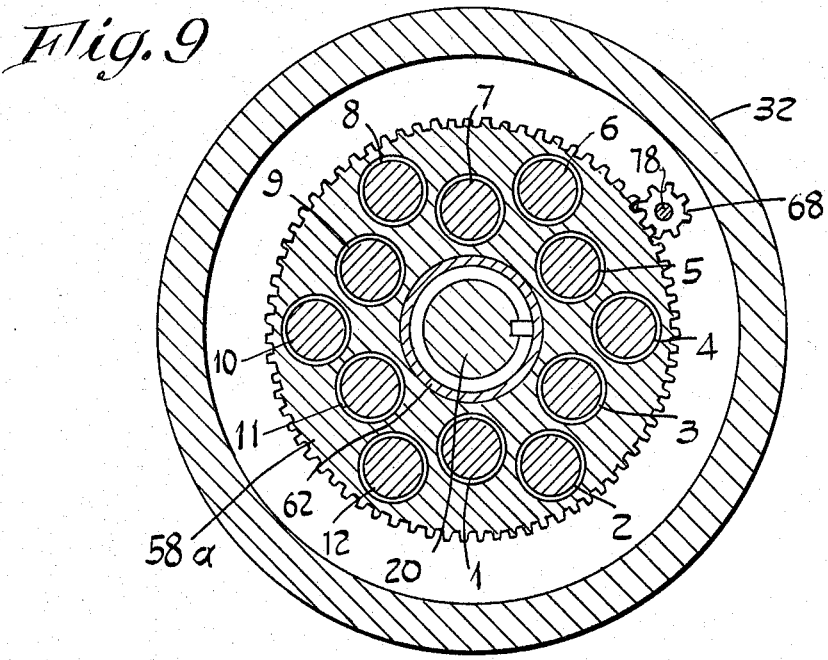
FIG. 9 is a horizontal sectional view similar to that which might be taken on the line 9a—9a of FIG. 1, but showing a modified ball and ball cage arrangement of the type usable with the two track cam of FIG. 4.

As provided by the invention, it will be seen from FIG. 9 that the cage 58 has a total of 12 openings, to accommodate 12 different rollers or balls. Considering the central lower opening as No. 1, and counting in a counterclockwise direction, the balls which are disposed in the openings 1, 5 and 9 may constitute one lifting group. The balls in the openings 2, 6 and 10 may constitute a second lifting group, the balls in the openings 3, 7 and 11 a third lifting group and the balls in the openings 4, 8 and 12 a fourth and final lifting group. Further, in accordance with the invention, the above four groups of rolling members or balls as seen in FIG. 9, are divided into inner and outer series located at different radial distances from the center whereby they traverse inner and outer, phase-shifted tracks of the rotary cams. This positioning will also enable the load transfer time to be increased. In addition, the groups of rolling members or balls are located non-symmetrically around the circumference of the cage whereby they are out of step in their action, thereby to further attain an increase in the load transfer time as well as a more uniform motion of the output screw 20. Again referring to FIG. 9, the first group of balls numbered 1, 5 and 9, may be angularly displaced 3° so that ball No. 1 is 3° to the right of the vertical center line, while the angular spacing between the three balls of this group remains exactly 120°. The second group comprising the balls 2, 6 and 10 are also arranged to be 120° apart, with the ball No. 2 disposed on a radial line making an angle of 65° 30′ with the vertical center line. The third group comprising the balls 3, 7 and 11, also 120° apart, is so arranged that balls No. 3 is on a radial line making an angle of exactly 68° with the vertical center line. The fourth and final group comprising the balls 4, 8 and 12, is also arranged so that the balls are 120° apart, and so that ball No. 4 is on a radial line which makes an angle of 100° 30′ with the vertical center line. Balls 1, 3, 5, 7, 9 and 11 use the inner cam tracks; the remainder use the outer cam tracks.

With the above disposition of the balls a more uniform output movement is achieved, as well as a greater load capacity and a more reliable cycling action, all with the easing of tolerances whereby a lesser degree of precision is required of the component parts.

Figure 12:
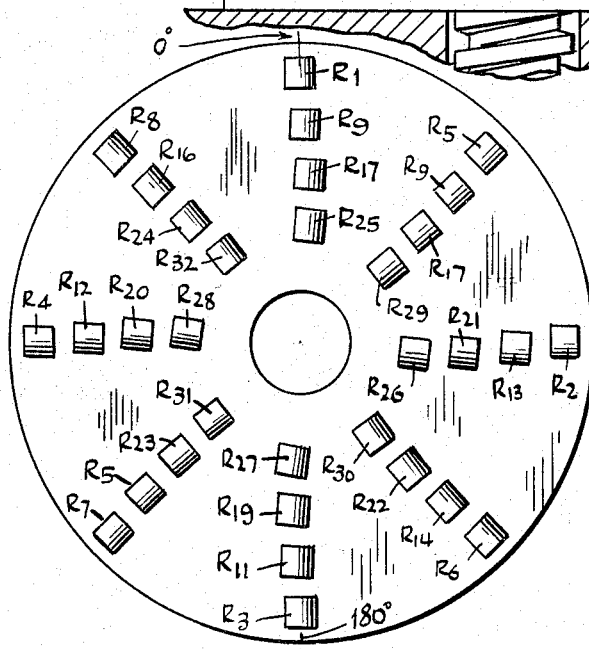
FIG. 12 is a plan view of a roller cage and rollers, revealing a larger number of the latter, constituting another embodiment of the invention.

Although twelve balls are shown in FIG. 9, it will be understood that a lesser or a greater number may be utilized. As an example, as many as 32 balls or rollers may be used in any one cam assemblage without difficulty, as illustrated in FIG. 12. These may be arranged in 8 radially disposed sets or groups of 4, the rollers in each set or group being laterally offset according to the following table:

| Roller No. | Degrees | Variation from true position |
|---|---|---|
| R1 | 0° | 0° |
| R2 | 90° | 0° |
| R3 | 180° | 0° |
| R4 | 270° | 0° |
| R5 | 45°45′ | 0°45′ |
| R6 | 135°45′ | 0°45′ |
| R7 | 225°45′ | 0°45′ |
| R8 | 315°45′ | 0°45′ |
| R9 | 1°30′ | 1°30′ |
| R10 | 91°30′ | 1°30′ |
| R11 | 131°30′ | 1°30′ |
| R12 | 271°30′ | 1°30′ |
| R13 | 47°15′ | 2°15′ |
| R14 | 137°15′ | 2°15′ |
| R15 | 227°45′ | 2°15′ |
| R16 | 317°15′ | 2°15′ |
| R17 | 2°45′ | 2°45′ |
| R18 | 92°45′ | 2°45′ |
| R19 | 182°45′ | 2°45′ |
| R20 | 272°45′ | 2°45′ |
| R21 | 48°30′ | 3°30′ |
| R22 | 138°30′ | 3°30′ |
| R23 | 228°30′ | 3°30′ |
| R24 | 318°30′ | 3°30′ |
| R25 | 4°15′ | 4°15′ |
| R26 | 94°15′ | 4°15′ |
| R27 | 184°15′ | 4°15′ |
| R28 | 274°15′ | 4°15′ |
| R29 | 50° | 5° |
| R30 | 140° | 5° |
| R31 | 230° | 5° |
| R32 | 320° | 5° |

In FIG. 12 the rollers are numbered R1, R2, R3, etc. up to R32. The above table gives the exact positions of all thirty-two rollers. Instead of the eight groups or sets shown, as few as three groups may be utilized. In such circumstance, R1 and R2 could be spaced apart 118° for example, R2 and R3 spaced apart 120°, and R3 and R4 spaced apart 122°. In any arrangement, the majority of different pairs of adjoining roller elements will be spaced apart an angular distance slightly different from the angle obtained by dividing 360° by the number of elements. The number of groups determines the number of crests of the rotary cams. For the FIG. 12 arrangement the rotary cams would have eight crests each.

Figure 10:
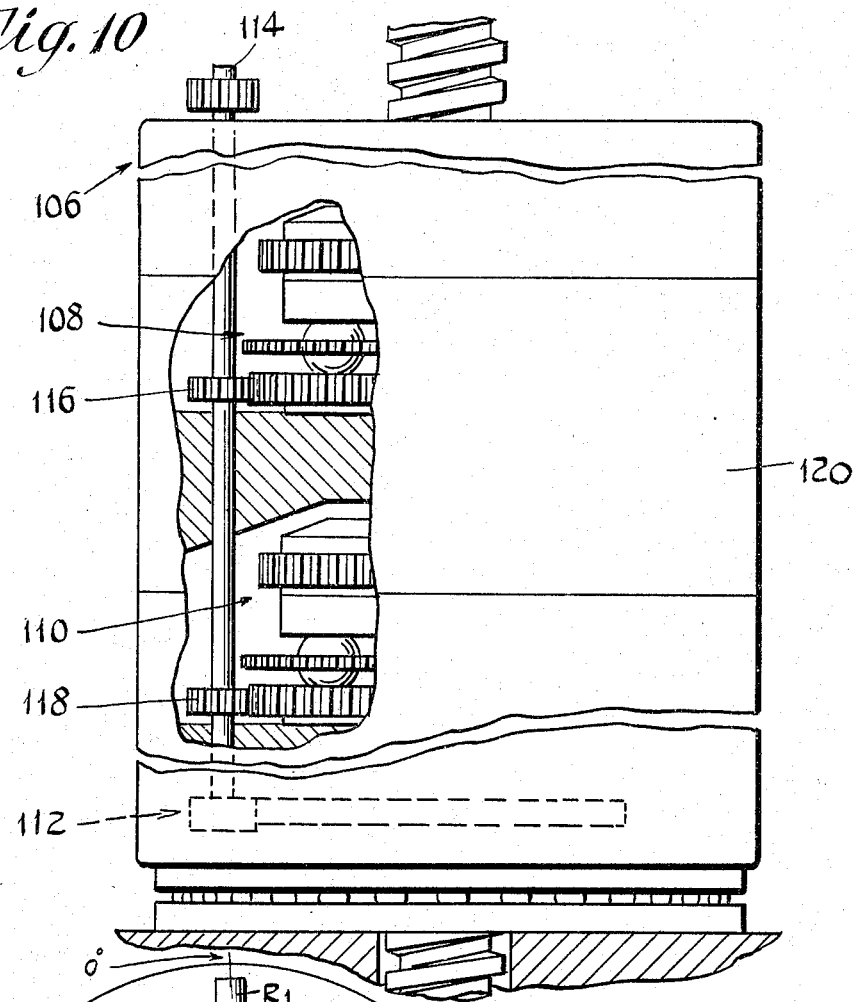
FIG. 10 is a view in side elevation, with a portion of the casing broken away to reveal interior details, of a mechanical transmission having several pairs of rotary cam units or assemblages in coaxial arrangement, to effect an increase in the load capabilities and a smoother output movement while at the same time enabling a reduction in width or girth to be effected.

Further, in accordance with the invention, a still greater uniformity of movement of the output screw 20 may be achieved by utilizing more than two sets of cam and driving nut assemblages. In FIG. 10 a transmission is illustrated wherein four cam assemblages are utilized, numbered respectively 106, 108, 110 and 112. By the provision of the additional cam units, all located coaxially with respect to each other, there is additionally provided a greater load capacity and at the same time a reduction in the diametric or radial dimensions of the transmission.

FIG. 10 also illustrates a slightly different input drive mechanism, comprising an input drive shaft 114 having pinions (only two of which, labelled 116 and 118, are shown) engaging the peripheral teeth of the lower cams of the four sets. With such organization, the casing 120 may remain stationary instead of constituting the input member, and the driving of the lower cams of the pairs will be effected by applying the driving force to the input shaft 114.

Yet another embodiment of the invention is illustrated in FIG. 11. In this embodiment, both the input and output movements of the transmission are rotary, the output movement being also capable of exerting much greater force and being of greatly reduced speed.

As shown, two pairs of upper and lower cam assemblages designated respectively 124 and 126 are provided in a stationary housing 128, the cam assemblages being disposed in coaxial relationship. In these units, upper rotary cams 130, 132 are continuously turned by pinions 134, 136 carried on a drive or input shaft 138. The cams 130, 132 are not axially movable, normally bearing against thrust bearing assemblages 140, 142. Antifriction roller elements or balls 144, 146 are carried in cages 148, 150, the latter being driven at half the rotative speed of the upper cams 130, 132 by gearing indicated generally by the numerals 152, 154. Lower cams 156 and 158 are respectively cooperable with the upper cams 130, 132 and are non-rotatable but instead axially movable. The lower cams 156, 158 bear against spur gear elements 160, 162 which are intermittently turned by gear segments of the gear means 152, 154 respectively. The spur gear elements 160, 162 are carried by shafts respectively 164 and 166, said shafts being axially movable as well as turnable and having loosely telescopically fitted sections 168 and 170. The sections 168, 170 have worms 172, 174 which mesh with a worm gear 176 carried by a power output shaft 178. The worms 172, 174 alternately shift axially downward without turning, to impart a clockwise turning movement to the worm gear 176. While one of the worms is driving the gear 176, the other worm is not under load and is given a reverse axial movement by imparting a partial turn to it, by means of the associated one of the gear means 152, 154. Thus, the worms 172, 174 and the worm gear 176 function in much the same manner as the driving nuts 38, 40 and the driven screw 20 in the embodiment of FIGS. 1–9. The contours of the cams 130, 132 and 156, 158 are similar to those shown in FIGS. 5, 6 and 7, as is also the disposition of the roller elements or balls 144, 146 and the arrangement of the ball cages. As with the other embodiments of the invention, additional cam units may be provided, located to be coaxial with the two cam units shown in FIG. 11, all to the end that a more uniform output movement of the worm gear 176 is had, together with more reliable transfer of power and load between the plurality of cam units together with a greater load capacity and a reduction in the diametric or radial size of the transmission. The advantages of the previous embodiments of the invention are thus also had in the embodiment of FIG. 11, the difference being that the output movement is of a rotary nature as distinguished from the linear output movement of the previous embodiment.

It will now be understood from the foregoing that I have effected improvements in the mechanical transmission of my identified patents, comprising non-uniform cam faces, non-symmetrical disposition of the rolling elements and different spacings of these from the center, and the use of more than two cam and nut assemblages, whereby there is had a more uniform output movement, a greater load capacity, a greater reduction in radial or diametric size, a more uniform transfer of load between the rolling elements and driving nuts, and a more reliable reverse movement of the driving nuts, all with a lesser degree of accuracy and precision being required in the various component parts.

Variations and modifications may be made within the scope of the claims, and portions of the improvement may be used without others.

I claim:
1. A mechanical transmission comprising, in combination:
   (a) a toothed driven member,
   (b) a threaded rotary driving member turnable and axially movable and engaged with the teeth of the driven member to provide for actuation of the latter in response to axial movement of the driving member and to enable the driving member to experience a reverse, return axial movement by turning and without requiring retrograde movement of the driven member,
   (c) a rotary cam held against axial movement,
   (d) means for intermittently turning the driving member in response to continuous turning of the rotary cam,
   (e) a second rotary cam disposed opposite the first cam and mounted for solely axial movement,
   (f) roller elements between and engaged with the cams,
   (g) a driven cage engaged with said roller elements,
   (h) means effecting an axial drive between the second cam and said driving element,
   (i) said cams having opposed wavy surfaces of complementary contour, formed by receding and advancing portions of each cam, said receding portions having a lesser circumferential length than said advancing portions.

2. A mechanical transmission as in claim 1, wherein:
   (a) the cams have 360° working areas,
   (b) at least three roller elements are disposed circumferentially about the 360° working areas of the cams,
   (c) the majority of different pairs of adjoining roller elements being spaced apart an angular distance slightly different from the angle obtained by dividing 360° by the number of elements.

3. A mechanical transmission as in claim 1, wherein:
   (a) the cams have 360° working areas,
   (b) at least three sets of roller elements are disposed circumferentially about the 360° working areas of the cams,
   (c) the majority of different pairs of adjoining roller elements of different sets being spaced apart an angular distance slightly different from the angle obtained by dividing 360° by the number of sets.

4. A mechanical transmission as in claim 3, wherein:
   (a) adjoining roller elements in any one set are angularly displaced with respect to each other by small increments.

5. A mechanical transmission as in claim 1, wherein:
   (a) the rotary cams have inner and outer cam tracks extending for 360° each,
   (b) there are at least three roller elements per track, disposed circumferentially, about the track working areas,
   (c) the majority of different pairs of adjoining rollers for any one track are spaced apart an angular distance slightly different from the angle obtained by dividing 360° by the number of elements traversing the track.

6. The mechanical transmission as in claim 1, in which there are two pairs of said cams, two said driving members, said driven member, two said intermittent turning means, two sets of said roller elements, two said driven cages, and two said means effecting axial drives, said one pair of cams being 180° out of phase with the other pair so that when high portions of one pair oppose each other the other pair has opposed low portions, thereby to impart continuous movement to the said driven member.

7. A mechanical transmission as in claim 1, wherein:
   (a) said cams and cage being constituted to cause the roller elements to be slightly out of step in traversing similar high and low portions of the cams.

8. The combination defined in claim 1, in which there are multiple pairs of said cams, multiples of said driving members and of said driven members, multiples of said intermittent turning means, multiples of sets of said roller elements, multiples of said driven cages, and multiples of said means effecting axial drives, certain of said pairs of cams being 180° out of phase with others of said pairs so that when high portions of said certain pairs oppose each other the other pairs have opposed low portions, thereby to impart continuous movement to the said driven member.

9. A mechanical transmission comprising, in combination:
   (a) a toothed driven member,
   (b) a threaded rotary driving member turnably and axially movable and engaged with the teeth of the driven member to provide for actuation of the latter in response to axial movement of the driving member and to enable the driving member to experience a reverse, return axial movement by turning and without requiring retrograde movement of the driven member, (c) a rotary cam held against axial movement, (d) means for intermittently turning the driving member in response to continuous turning of the rotary cam, (e) a second rotary cam disposed opposite the first cam and mounted for both rotary and axial movement, (f) roller elements between and engaged with the cams, (g) a driven cage engaged with said roller elements, (h) means effecting an axial drive between the second cam and said driving element, (i) said cams having opposed wavy surfaces of similar contour, formed by receding and advancing portions of each cam, said receding and advancing portions being paired on each cam, and each cam having a plurality of said paired portions, equispaced circumferentially thereon, (j) said cage disposing the roller elements out of circumferentially equispaced relation by small angles constituting small fractional parts of the spacing between any adjoining two elements.

10. A mechanical transmission as in claim 9, wherein:

(a) the tracks of the cams and the cage extend through 360°, (b) there are at least three roller elements in the cage, (c) the angular spacing between the majority of different pairs of adjoining roller elements is different from but closely approximates the angle $360°/n$ where $n$ equals the total number of elements traversing substantially the same cam paths.

11. A mechanical transmission as in claim 10, wherein:

(a) the tracks of the cams and the cage extend through 360°, (b) there are at least three sets of roller elements in the cage, (c) the angular spacing between the majority of different pairs of adjoining roller elements of different sets is different from but closely approximates the angle $360°/n$ where $n$ equals the total number of elements traversing substantially the same paths on the cam tracks.

12. A mechanical transmission as in claim 11, wherein:

(a) the roller elements in any set are slightly out of step in attaining the same relative positions on the cams.

13. A mechanical transmission comprising, in combination:

(a) a toothed driven member, (b) a threaded rotary driving member turnably and axially movable and engaged with the teeth of the driven member to provide for actuation of the latter in response to axial movement of the driving member and to enable the driving member to experience a reverse, return axial movement by turning and without requiring retrograde movement of the driven member, (c) a rotary cam held against axial movement, (d) means for intermittently turning the driving member in response to continuous turning of the rotary cam, (e) a second rotary cam disposed opposite the first cam and mounted for both rotary and axial movement, (f) roller elements between and engaged with the cams, (g) a driven cage engaged with said roller elements, (h) means effecting an axial drive between the second cam and said driving element, (i) said cams having opposed wavy surfaces of complementary contour, formed by receding and advancing portions of each cam, said receding and advancing portions being paired on each cam, and each cam having a plurality of said paired portions, spaced circumferentially thereon, (j) said cams and cage being so organized that the roller elements are slightly out of step in attaining the same relative positions on the paired portions of the cams.

References Cited by the Examiner

UNITED STATES PATENTS

| | | | |
|---|---|---|---|
| 2,928,287 | 3/1960 | Chillson | 74—388 |
| 2,996,805 | 1/1961 | Chillson | 74—388 |
| 3,008,340 | 11/1961 | Chillson | 74—424.8 |

DAVID J. WILLIAMOWSKY, *Primary Examiner.*

LEONARD H. GERIN, *Examiner.*